Oct. 23, 1928.
C. B. HARBISON
SIX-WHEEL TRUCK
Filed July 25, 1927
1,689,025
3 Sheets-Sheet 1
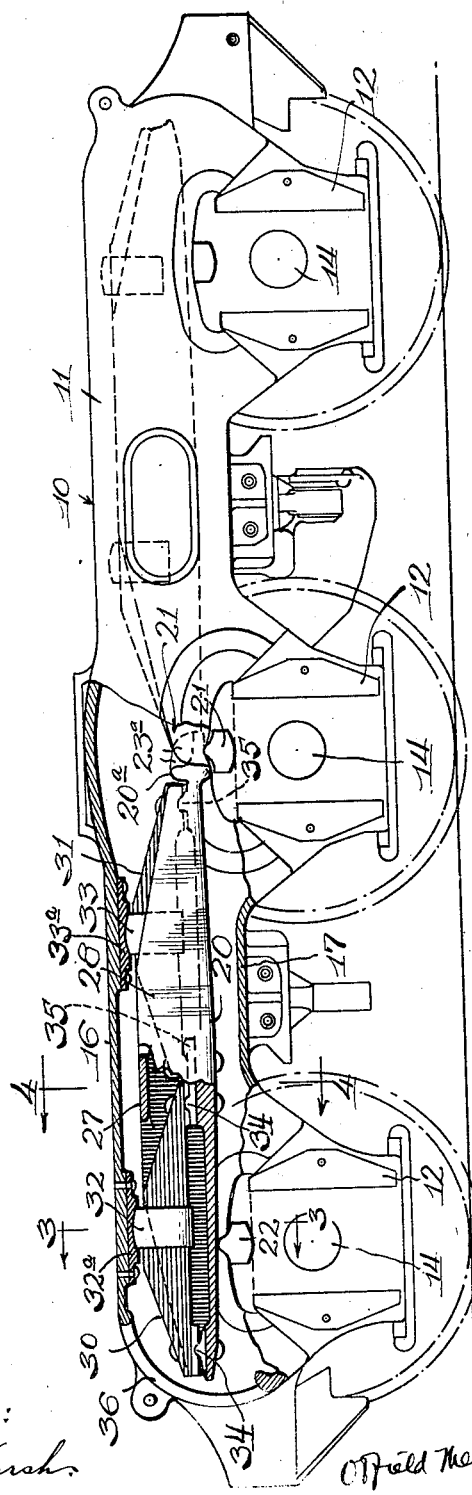

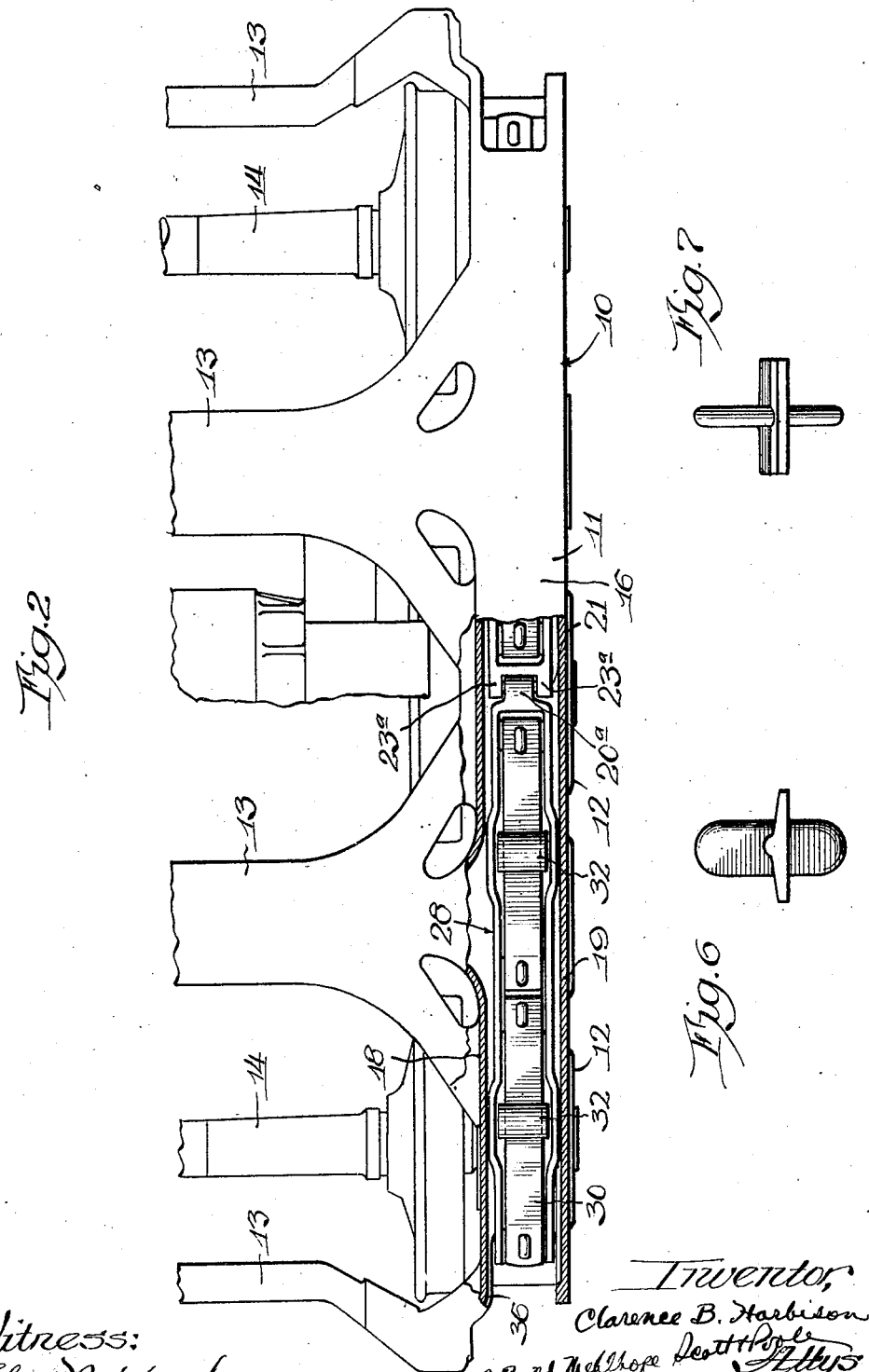

Oct. 23, 1928.
C. B. HARBISON
1,689,025
SIX-WHEEL TRUCK
Filed July 25, 1927
3 Sheets-Sheet 3
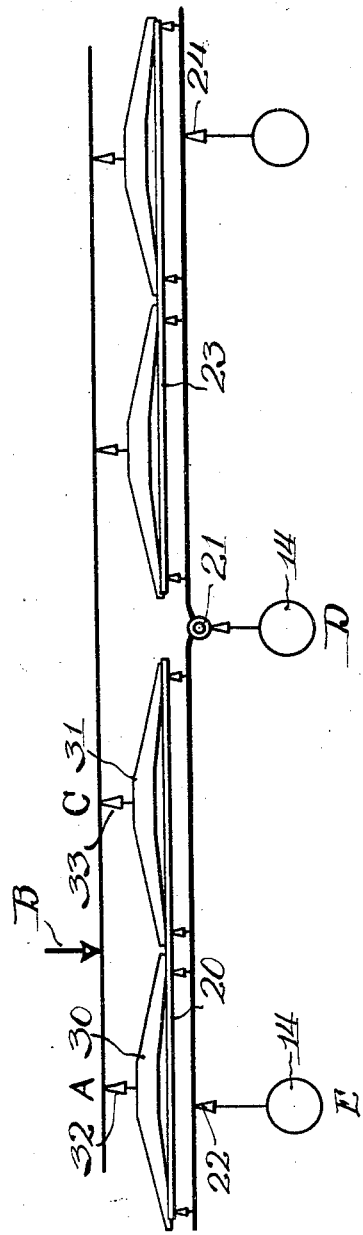
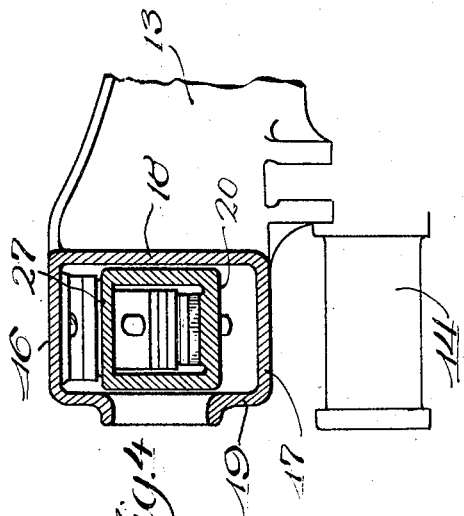
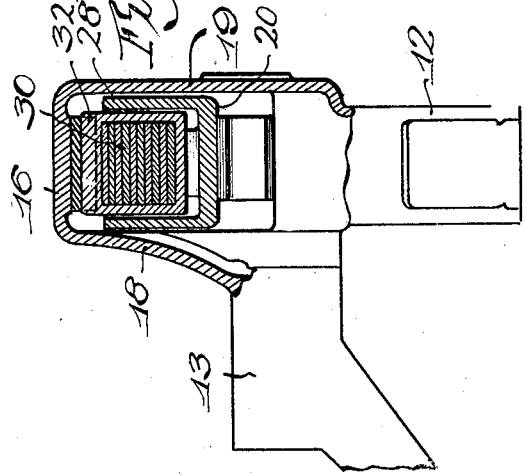
Witness
Chas. R. Konrsh.
Inventor
Clarence B. Harbison
Offield Nebeker Scott & Poole
Attys Patented Oct. 23, 1928.

1,689,025

UNITED STATES PATENT OFFICE.

CLARENCE B. HARBISON, OF LIMA, OHIO, ASSIGNOR TO THE OHIO STEEL FOUNDRY COMPANY, OF LIMA, OHIO, A CORPORATION OF OHIO.

SIX-WHEEL TRUCK.

Application filed July 25, 1927. Serial No. 208,140.

This invention relates to improvements in railway truck equalizers, and more particularly to equalizers for six-wheel trucks, and has for its principal object to provide an improved construction and arrangement of spring equalizing devices whereby a plurality of leaf springs of uniform size are provided, and which may be readily applied or removed from the truck.

The invention may best be understood by reference to the accompanying drawings, in which Figure 1 is a side view of a truck, with parts broken away to show the arrangement of the spring equalizing devices.

Figure 2 is a fragmentary plan view showing one side of the truck,

Figure 3 is an enlarged detail section taken on line 3—3 of Figure 1,

Figure 4 is an enlarged detail section taken on line 4—4 of Figure 1,

Figure 5 is a diagram showing the arrangement of springs and equalizer bars, and Figures 6 and 7 are detail side and end views of the spring saddle pins.

Referring to details of the embodiment of the invention shown herein, the main truck body 10 is formed of a single casting, including side frame members 11, 11, three depending journal box pedestals 12, 12, 12, and connecting suitable cross frame members 13, 13. Three wheel axles 14, 14, 14, have journal boxes disposed as usual in the pedestals 12, 12, 12, the journal boxes, for clarity of illustration, being omitted in the drawings.

The frame members 11, 11, at each side of the truck are preferably formed in hollow or box like cross-section throughout the length of the truck, having upper and lower transverse webs 16 and 17, and inner and outer side walls 18 and 19, respectively, as best shown in Figure 4. The equalizing devices of the truck are disposed within these hollow sections, the devices on the two sides being similar, so a description of one set will suffice for an understanding of both.

An equalizer bar 20 extends from the central journal box bearing saddle 21 to one of the end journal box saddles, as for instance the left hand saddle 22, and a similar equalizer bar 23 extends to the other journal saddle 24. As shown in Figure 2, the inner end of equalizer bar 20 comprises a single arm 20$^a$ fitting between two arms 23$^a$, 23$^a$ of the companion equalizer bar 23 so as to provide bearing for both bars on saddle 21, but in other respects the two equalizer bars and their associated parts may be similar. Each of them extends somewhat beyond the saddle of its respective journal box, and is generally U-shaped in cross section, as shown in Figure 3, excepting at its central portion, where a cross member 27 connects the two side walls 28, 28, together, as shown in Figure 4.

Referring now to equalizer bar 20, the same is provided with two springs 30 and 31, placed in alignment within the bar, with their respective centers 32 and 33 in supporting engagement with spring seats 32$^a$, 33$^a$, across the upper wall 16 of side frame members, and with their ends engaging saddle pins 34, 34 and 35, 35, carried on said equalizer bar. The springs 30 and 31 are preferably uniform in size and strength, so as to be interchangeable. In order to equalize the pressures thereon, the center B between the centers A, C of the two springs 30 and 31 is two-thirds of the distance from the center wheel axis D to the axis E of the outer wheel. In the form shown, the spring seat 32 of outer spring 30 is disposed substantially in line with and above the outer journal box, so that in order to maintain the proportions above mentioned, the seat 33 of inner spring 31 is disposed substantially ⅔ the distance from the axis of the outer axle to the axis of the center axle.

With the construction above described, a six wheel truck may be provided with eight leaf springs, as against six springs usually provided for a similar purpose. These springs are of uniform size so as to be interchangeable for ready replacement or repair. Furthermore, they may be readily installed or removed, together with the equalizer bar, by withdrawing them endwise through the openings 36, 36, at opposite ends of the hollow frame members 11, 11, without making it necessary to remove the truck from beneath the car.

Although I have shown and described certain embodiments of my invention, it will be understood that I do not wish to be limited to the exact construction illustrated and described, but that various changes and modifications may be made without departing from the spirit and scope of the invention.

I claim:

1. A car truck having side frame members, three wheel axles, journal boxes for said axles an equalizer bar extending from each center journal box to the two adjacent end boxes, and two leaf springs interposed between each equalizer bar and its respective side frame member, said springs being arranged with the center between them disposed substantially two-thirds the distance from the center box to said end journal box.

2. A car truck having hollow side frame members open at the ends thereof, three wheel axles, journal boxes for said axles, an equalizer bar extending from each center journal box to the two adjacent end boxes, and two leaf springs interposed between each equalizer bar and its respective side frame member, said springs being arranged with the center between them disposed substantially two-thirds the distance from the center box to said end journal box.

3. A car truck having side frame members, three wheel axles, journal boxes for said axles, an equalizer bar generally U-shaped in cross section and extending from each center journal box to the two adjacent end boxes, and two leaf springs disposed between the side walls of each bar and interposed between said bar and its respective side frame member, said springs being arranged with the center between them disposed substantially two-thirds the distance from the center box to said end journal box.

4. A car truck having side frame members, three wheel axles, journal boxes for said axles, an equalizer bar extending from each center journal box and beyond the two adjacent end boxes, and two similar leaf springs interposed between each equalizer bar and its respective side frame member, one of said springs having its center disposed substantially over the axis of its end journal box, and the other spring having its center disposed substantially one-third the distance from the center box to said end journal box.

5. A car truck having side frame members, three wheel axles, journal boxes for said axles, an equalizer bar extending from each center journal box to the two adjacent end boxes, and two similar leaf springs interposed between each equalizer bar and its respective side frame member, said springs having their centers engaging said side frame, and with the center between them disposed substantially two-thirds the distance from the center box to said end journal box.

6. A car truck having hollow side frame members open at the ends thereof, three wheel axles, journal boxes for said axles, an equalizer bar extending from each center journal box and beyond the adjacent end boxes, and two similar leaf springs interposed between each equalizer bar and its respective side frame member, one of said springs having its center engaging said side frame substantially over the axis of its end journal box, and the other spring having its center engaging said side frame substantially one-third the distance from the center box to said end journal box, said springs and bars being removable longitudinally at opposite ends of said hollow frame member.

Signed at Lima, Ohio, this 6th day of July, 1927.

CLARENCE B. HARBISON.